United States Patent
Falkenberg et al.

(10) Patent No.: US 9,434,881 B1
(45) Date of Patent: *Sep. 6, 2016

(54) SYNTHETIC FLUIDS AS COMPACTION AIDS

(71) Applicant: Soilworks, LLC, Scottsdale, AZ (US)

(72) Inventors: Chad Edward Falkenberg, Scottsdale, AZ (US); Dorian Amber Lorrayne-Falkenberg, Scottsdale, AZ (US)

(73) Assignee: Soilworks, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/835,072

(22) Filed: Aug. 25, 2015

(51) Int. Cl.
| | | |
|---|---|---|
| C09K 17/00 | (2006.01) | |
| E02D 3/12 | (2006.01) | |
| C09K 17/14 | (2006.01) | |
| C09K 17/18 | (2006.01) | |
| E02D 3/02 | (2006.01) | |
| E02D 3/00 | (2006.01) | |
| E01C 3/04 | (2006.01) | |
| E01C 19/48 | (2006.01) | |

(52) U.S. Cl.
CPC ............... *C09K 17/14* (2013.01); *C09K 17/18* (2013.01); *E01C 3/04* (2013.01); *E01C 19/48* (2013.01); *E02D 3/005* (2013.01); *E02D 3/02* (2013.01)

(58) Field of Classification Search
CPC ..................... B05D 5/00; C09K 3/22; C09K 17/00–17/34; E02D 3/12; E02D 3/123; E02D 3/126
USPC .......................... 405/263, 271; 252/88.1, 88.2
See application file for complete search history.

(56) References Cited

U.S. PATENT DOCUMENTS

| | | | |
|---|---|---|---|
| 4,462,718 A | * 7/1984 | McLaughlin | C09K 8/5751 166/305.1 |
| 4,941,924 A | 7/1990 | Merritt | |
| 4,988,388 A | * 1/1991 | Schloman, Jr. | C05F 11/00 106/164.41 |
| 5,559,166 A | 9/1996 | Bearden | |
| 6,008,164 A | 12/1999 | Aldrich et al. | |
| 6,059,955 A | 5/2000 | Cody et al. | |
| 6,080,301 A | 6/2000 | Berlowitz et al. | |
| 6,090,989 A | 7/2000 | Trewella et al. | |
| 6,096,940 A | 8/2000 | Wittenbrink et al. | |
| 6,103,099 A | 8/2000 | Wittenbrink et al. | |

(Continued)

FOREIGN PATENT DOCUMENTS

| | | |
|---|---|---|
| EP | 0668342 | 8/1995 |
| EP | 0776959 | 6/1997 |
| WO | 9708390 | 3/1997 |

OTHER PUBLICATIONS

"Stop Dust in Its Tracks" Brochure Midwest Industrial Supply, Inc. Feb. 18, 2005.

(Continued)

*Primary Examiner* — Frederick L Lagman
*Assistant Examiner* — Stacy Warren
(74) *Attorney, Agent, or Firm* — Hovey Williams LLP

(57) ABSTRACT

Compaction aid compositions and methods for compacting soils, sands, and other aggregates are described herein. In particular, the compaction aid compositions can comprise at least one synthetic fluid that was previously derived from a Gas-to-Liquids process. The compactions aids can be used to efficiently and effectively compact various soils, sands, and other aggregates at temperatures below the freezing point of water, thereby making such compaction aids highly useful in arctic and subarctic environments.

23 Claims, 1 Drawing Sheet

(56) References Cited

U.S. PATENT DOCUMENTS

| | | | |
|---|---|---|---|
| 6,165,949 A | 12/2000 | Berlowitz et al. | |
| 6,332,974 B1 | 12/2001 | Wittenbrink et al. | |
| 6,410,488 B1 | 6/2002 | Fefer et al. | |
| 6,475,960 B1 | 11/2002 | Berlowitz et al. | |
| 6,599,864 B1 | 7/2003 | Bertomeu | |
| 7,067,049 B1 | 6/2006 | Baillargeon et al. | |
| 7,074,266 B2 | 7/2006 | Hawkins et al. | |
| 7,081,270 B2 | 7/2006 | Hawkins et al. | |
| 8,048,333 B2 | 11/2011 | Vitale et al. | |
| 8,070,980 B2 | 12/2011 | Vitale et al. | |
| 8,177,997 B2 | 5/2012 | Vitale | |
| 8,313,668 B2 | 11/2012 | Vitale et al. | |
| 8,968,592 B1 | 3/2015 | Falkenberg et al. | |
| 9,068,106 B1 | 6/2015 | Falkenberg et al. | |
| 2002/0025382 A1 | 2/2002 | Hawkins et al. | |
| 2005/0106086 A1 | 5/2005 | Tomlinson et al. | |
| 2005/0124527 A1* | 6/2005 | Hawkins | C09K 17/14 510/446 |
| 2007/0093602 A1* | 4/2007 | Thompson-Colon | C04B 26/16 525/127 |
| 2010/0189893 A1* | 7/2010 | Vitale | C09K 17/22 427/206 |
| 2011/0229269 A1 | 9/2011 | Vitale et al. | |
| 2011/0318115 A1 | 12/2011 | Vitale | |
| 2013/0037621 A1* | 2/2013 | Wantling | C09K 3/22 239/1 |
| 2013/0140486 A1 | 6/2013 | Vitale et al. | |
| 2014/0018587 A1* | 1/2014 | Fang | C07C 1/047 585/317 |
| 2014/0138573 A1* | 5/2014 | Vitale | C09K 3/22 252/88.1 |
| 2014/0140767 A1 | 5/2014 | Vitale et al. | |
| 2014/0140771 A1 | 5/2014 | Vitale et al. | |
| 2014/0140774 A1 | 5/2014 | Vitale et al. | |
| 2014/0140775 A1 | 5/2014 | Vitale et al. | |

OTHER PUBLICATIONS

EK35 Brochure, International Consulting Group, Inc. Aug. 24, 2007.

"What is a Synthetic? Depends on Whom You Ask" Midwest Industrial Supply, Inc., www.midwestind.com. Oct. 3, 2011.

Detloff, Cheryl "Synthetic-Based Fluid Versus Oil Dust Suppressants" Midwest Industry Supply, Inc., disclosure material, Jun. 12, 2012.

Material Safety Data Sheet for Dust Suppressant Fluid 65, Petro-Canada, Oct. 21, 2013, http://lubricants.petro-canada.ca/resource/download.aspx?type=MSDS&iproduct=714&language=en&region=CA.

Material Safety Data Sheet for 50 Neutral Light Basestock, Petro-Canada, Apr. 5, 2012, http://www.online.petro-canada.ca/datasheets/en_CA/n50lht.pdf.

TechData for Dust Suppressant Fluid DSF 65, Petro-Canada, http://lubricants.petro-canada.ca/resource/download.aspx?type=TechData&iproduct=714&language=en Sep. 8, 2011.

Material Safety Data Sheet for EK35 by the Midwest Industrial Supply, Inc., Jun. 2, 2011.

Mine Road Stabilization Brochure EK35 produced by Midwest Industrial Supply, Inc., Jun. 16, 2003.

Material Safety Data for EK35 Synthetic Organic Dust Control produced by Midwest Industrial Supply Inc., Feb. 19, 2003.

EnviroKleen—Clean Air for Underground Mining Brochure produced by the Midwest Industrial Supply, Inc. Jun. 16, 2003.

Material Safety Data Sheet for EnviroKleen produced by the Midwest Industrial Supply Inc. Mar. 24, 2011.

"When It Comes to Controlling Dust Ultra-Pure EnviroKleen is the Answer to Your Prayers" produced by Midwest Industrial Supply, Inc., Sep. 29, 2003.

The OA dated Sep. 26, 2014, U.S. Appl. No. 14/250,255, filed Apr. 10, 2014.

The Office Action dated May 28, 2014, in U.S. Appl. No. 14/250,230, filed Apr. 10, 2014.

The International Search Report and Written Opinion dated Jul. 2, 2015, in PCT/US/25135.

Corrected Petition for Post Grant Review of U.S. Pat. No. 8,968,592 dated Dec. 18, 2015.

Petition for Post Grant Review of U.S. Pat. No. 9,068,106 dated Mar. 30, 2016.

* cited by examiner

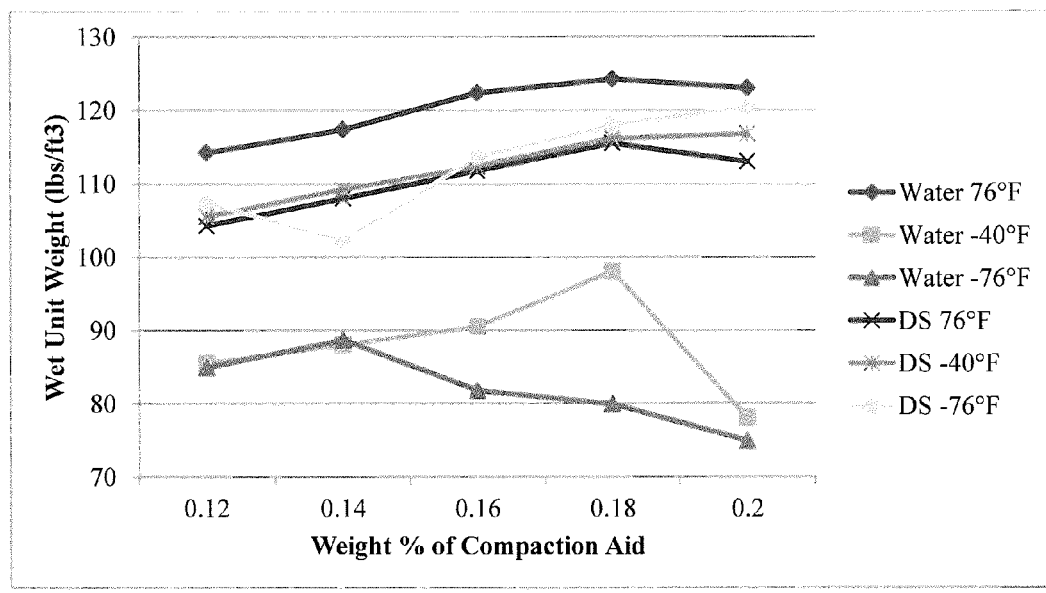

SYNTHETIC FLUIDS AS COMPACTION AIDS

BACKGROUND

1. Field of the Invention

The present invention is generally directed to compaction aid compositions comprising a synthetic fluid. More particularly, the present invention is generally related to compaction aid compositions that can effectively compact various soils and aggregates in arctic and subarctic environments.

2. Description of the Related Art

Due to the increased focus on petroleum drilling, mining operations, and other resource extraction initiatives in subarctic and arctic environments, there has been a desire for compaction aids that can work under these colder conditions. Compaction aids can find many applications during these commercial endeavors and are generally used to compact soil and other aggregates in order to facilitate the building of roads, embankments, and other earthwork structures that require some level of support and reinforcement.

Although many compaction aids exist on the market today, very few of these compaction aids are able to effectively offset the adverse effects of freezing temperatures on the compaction properties of soils and various aggregates. Thus, many of the existing compaction aids have limited applicability, which can generally be dictated by the temperature conditions in which they are applied. Furthermore, the limited ability of these existing compaction aids to be used in freezing temperatures also limits their geographical applicability in that they would have limited value and applicability in many subarctic and arctic environments.

Thus, there is a need for a compaction aid composition that can be used to compact various soils and aggregates into the desired earthwork structure under arctic and subarctic conditions.

SUMMARY

One or more embodiments of the present invention concern a method for compacting a material. The method generally comprises combining a compaction aid with the material to form a treated material, wherein the compaction aid comprises a synthetic fluid containing at least one acyclic aliphatic compound and at least one cyclic aliphatic compound. In such embodiments, the acyclic aliphatic compound can comprise one or more methyl-branched alkanes, one or more dimethyl-branched alkanes, and one or more trimethyl-branched alkanes.

One or more embodiments of the present invention concern a method for compacting a material. The method generally comprises: (a) combining a compaction aid with the material to form a mixture and (b) compacting the mixture to form a compacted matrix, wherein the compaction aid comprises a synthetic fluid containing at least one acyclic aliphatic compound and at least one cyclic aliphatic compound. In such embodiments, at least 3 weight percent of the at least one acyclic compound has a carbon chain length in the range of $C_{29}$ to $C_{36}$ and at least 3 weight percent of the at least one cyclic aliphatic compound has a carbon chain length in the range of $C_{29}$ to $C_{36}$.

One or more embodiments of the present invention concern a method for compacting a material. The method generally comprises (a) combining a compaction aid with the material to form a mixture and (b) compacting the mixture to form a compacted matrix, wherein the compaction aid consists of a synthetic fluid containing at least one acyclic aliphatic compound and at least one cyclic aliphatic compound. In such embodiments, the acyclic aliphatic compound can comprise one or more methyl-branched alkanes, one or more dimethyl-branched alkanes, and one or more trimethyl-branched alkanes, while the cyclic aliphatic compound can comprise one or more dimethyl-branched alkanes with cyclopentyl or cyclohexyl rings.

One or more embodiments of the present invention concern a compaction aid for compacting a soil, sand, or aggregate. The compaction aid comprises (a) a synthetic fluid comprising at least one acyclic aliphatic compound and at least one cyclic aliphatic compound and (b) a binder. In addition, at least 3 weight percent of the at least one acyclic compound has a carbon chain length in the range of $C_{29}$ to $C_{36}$ and at least 3 weight percent of the at least one cyclic aliphatic compound has a carbon chain length in the range of $C_{29}$ to $C_{36}$.

BRIEF DESCRIPTION OF THE FIGURES

Embodiments of the present invention are described herein with reference to the following drawing figures, wherein:

FIG. 1 is a graph comparing the compaction properties of DURASOIL and water at varying temperatures.

DETAILED DESCRIPTION

The present invention is generally related to improving the densities of soils, sands, and other aggregates compacted at low (e.g., below freezing) temperatures. More specifically, the compaction aids of the present invention can be used to offset the adverse effects of lower temperatures on the compaction properties of various soils, sands, and aggregates. The compaction aids can be considered safe, virtually non-toxic compositions that can facilitate the compaction of various soils, sands, and aggregates at freezing temperatures. Unlike other compaction aids, the compaction aid compositions described herein can be applied in undiluted form, can remain active over long periods of time, can be insoluble in water, and can contain no electrolytes.

More particularly, blending the compaction aids of the present invention with soils, sands, and other aggregates can increase the bearing strength and other mechanical properties of the material once it has been compacted. These improvements in compacted characteristics can be achieved at arctic and subarctic temperatures, which are well below the freezing point of water. Generally, water can be used in warmer climates to help compact various surface particulates. However, the compaction aids described herein have the benefit over traditional compaction aids, such as water, of being functional at lower temperatures in which water cannot be used due to its freezing point. Consequently, the soils, sands, and other aggregates compacted at lower temperatures with the compaction aids described herein can exhibit greater bearing strength, water proofing, protection against freeze thaw, and frost heave.

The compaction aid can displace water molecules within the material to be treated, which can lower the freezing temperature of the material. Consequently, the material modified with the compaction aid can be compacted at lower temperatures due to this enhanced freezing temperature. In other words, the addition of the compaction aid described herein can depress the freezing point of the material to be treated, thereby facilitating the compaction of the material.

Additionally, the compaction aid of the present invention can improve the cohesion between the particulates forming the material to be treated, thereby further facilitating the compaction of such materials. Not wishing to be bound by theory, the compaction aids of the present invention can be capable of effectively lubricating the soil and aggregate particles, while also inducing capillary forces. More particularly, the compaction aids can reduce interparticle friction in the treated material, thereby allowing better compaction of the material and increasing the density of the treated soils, sands, and aggregates.

Consequently, the various soils, sands, and aggregates compacted with the compaction aid of the present invention can provide a self-healing surface that is continuously active.

As previously mentioned, the material that is blended with the compaction aid and subsequently compacted can comprise a soil, sand, and various other aggregates. In various embodiments, the material combined with the compaction aid described herein and subsequently compacted can comprise at least 25, 50, 70, 85, or 95 weight percent of soil, sand, and other aggregates. Sand and aggregates can include, for example, clay, silt, cobbles, and boulders. In certain embodiments, the material combined with the compaction aid described herein and subsequently compacted can be formed entirely of soil, sand, and other aggregates.

The material to be treated can comprise a certain amount of ice and/or unfrozen water. As would be appreciated in the art, the amount and presence of ice and water in the material to be treated can affect its compaction characteristics.

The compaction aids of the present invention can be used to form various earthworks including, for example, roads, helicopter landing pad, military trails, equestrian tracks, mine tailing, runways, parking lots, farmland, embankments, intermodal yards, backfills, sport fields, and various other earthworks that can be formed from compacted materials. As used herein, an "earthwork" refers to an artificial landscaping with archaeological features.

Synthetic Fluids for the Compaction Aid Compositions

The compaction aid compositions described herein can comprise, consist essentially of, or consist of a synthetic fluid. In various embodiments, the compaction aid composition can comprise at least 1, 5, 10, 20, 40, 60, 80, 90, 95, or 99 weight percent of the synthetic fluid. As used herein, "synthetic" means that the relevant fluid has undergone at least some chemical transformation during its production. Thus, this would exclude materials that have only been subjected to a simple purification or separation process that does not alter the chemical composition of the material.

In various embodiments, the compaction aid consists entirely of the synthetic fluid, which can be applied in its pure (i.e., undiluted) form. Thus, in such embodiments, the compaction aid will not contain any binders or other additives, such as carboxylic acids, polyolefins, or pour point depressants.

The synthetic fluids can be in the form of a liquid. In various embodiments, the synthetic fluids are produced using a Gas-to-Liquids ("GTL") process. The GTL process is a process for converting natural gas into synthetic fluids. Due to the GTL process, the resulting synthetic fluids can be extremely pure and virtually free of various contaminants, such as nitrogen, metals, and sulfur. In certain embodiments, the synthetic fluids can comprise a synthetic hydrocarbon fluid.

The GTL process generally involves: (1) carrying a natural gas to a processing facility; (2) separating water and other byproducts from the natural gas; (3) introducing the pure natural gas into a gasification reactor, wherein the natural gas is mixed with oxygen and is converted into synthesis gas; (4) introducing the synthesis gas into a reactor wherein a catalyst converts the gas into long-chain waxy hydrocarbons and water; (5) cracking the long-chain hydrocarbons in a cracker with hydrogen in order to produce shorter hydrocarbons; and (6) distilling the cracked hydrocarbon products into various liquids products having different boiling points.

The GTL process is further described in PCT Application Publication No. WO 02/070631, the entire disclosure of which is incorporated herein by reference in its entirety. In addition, synthetic fluids are also described in European Patent No. EP0668342, European Patent No. EP0776959; U.S. Pat. No. 6,008,164; U.S. Pat. No. 6,059,955; U.S. Pat. No. 6,080,301; U.S. Pat. No. 6,090,989; U.S. Pat. No. 6,096,940; U.S. Pat. No. 6,103,099; U.S. Pat. No. 6,165,949; U.S. Pat. No. 6,332,974; U.S. Pat. No. 6,475,960; U.S. Pat. No. 6,599,864; and U.S. Pat. No. 7,067,049, the disclosures of which are incorporated herein by reference in their entireties.

Compared to conventional petroleum-based fluids used previously in compaction, GTL synthetic fluids generally have a more uniform chemical structure, which can allow for a more consistent performance when applied in the field.

In various embodiments, the synthetic fluid can comprise, consist essentially of, or consist of at least one acyclic aliphatic compound and/or at least one cyclic aliphatic compound. For example, the synthetic fluid can comprise at least 25, 50, 60, 75, 85, 90, 95, or 99 weight percent of one or more acyclic aliphatic compounds. Additionally or alternatively, the synthetic fluid can comprise at least 0.1, 0.5, 1, or 3 and/or not more than 75, 60, 45, or 35 weight percent of one or more cyclic aliphatic compounds. More particularly, the synthetic fluid can comprise in the range of 0.1 to 75, 0.5 to 60, 1 to 45, or 3 to 35 weight percent of one or more cyclic aliphatic compounds. As used herein, "aliphatic" refers to a compound that is composed of carbon and hydrogen.

In one or more embodiments, the acyclic aliphatic compound can comprise at least one linear alkane, branched alkane, or a combination thereof. As used herein, an "alkane" refers to an aliphatic compound that only contains single bonds. Additionally or alternatively, the cyclic aliphatic compound can comprise at least one cycloalkane, alicyclic compound, or a combination thereof. As used herein, an "alicyclic compound" refers to a compound that comprises a cycloalkane component and a linear or branched alkane component. In certain embodiments, the synthetic fluid useful in the compaction aid compositions can comprise, consist essentially of, or consist of linear alkanes, branched alkanes, cycloalkanes, and/or alicyclic compounds.

In various embodiments, the alicyclic compound can comprise branched alkanes having at least one cyclic hydrocarbon ring, linear alkanes having at least one cyclic hydrocarbon ring, or a combination thereof. In certain embodiments, the alicyclic compound can comprise dimethyl-branched alkanes with cyclopentyl and/or cyclohexyl rings.

In various embodiments, the synthetic fluid useful for the compaction aid compositions can comprise at least 50, 60, 75, 85, 90, 95, 99, or 99.9 weight percent of one or more linear alkanes, branched alkanes, cycloalkanes, alicyclic compounds, or combinations thereof.

In various embodiments, the synthetic fluid can comprise one or more branched alkanes having at least one methyl branch. In certain embodiments, the synthetic fluid can comprise at least 1, 5, 10, or 15 and/or not more than 75, 60, 50, or 35 weight percent of at least one methyl-branched alkane. More particularly, the synthetic fluid can comprise in the range of 1 to 75, 5 to 60, 10 to 50, or 15 to 35 weight percent of at least one methyl-branched alkane. Furthermore, in certain embodiments, the synthetic fluid can comprise at least 1, 5, 15, or 30 and/or not more than 95, 80, 70, or 55 weight percent of at least one dimethyl-branched alkane. More particularly, the synthetic fluid can comprise in the range of 1 to 95, 5 to 80, 15 to 70, or 30 to 55 weight percent of at least one dimethyl-branched alkane. Additionally or alternatively, the synthetic fluid can comprise at least 1, 5, 10, or 15 and/or not more than 75, 60, 45, or 30 weight percent of at least one trimethyl-branched alkane. More particularly, the synthetic fluid can comprise in the range of 1 to 75, 5 to 60, 10 to 45, or 15 to 30 weight percent of at least one trimethyl-branched alkane.

Moreover, in various embodiments, the synthetic fluid can comprise an alicyclic compound. In certain embodiments, the synthetic fluid can comprise at least 0.1, 0.5, 1, or 5 and/or not more than 75, 60, 45, or 35 weight percent of at least one dimethyl-branched alkane with a cyclopentyl ring and/or a cyclohexyl ring. More particularly, the synthetic fluid can comprise in the range of 0.1 to 75, 0.5 to 60, 1 to 45, or 5 to 35 weight percent of at least one dimethyl-branched alkane with a cyclopentyl ring and/or a cyclohexyl ring.

In certain embodiments, the synthetic fluid can comprise a commercially-available synthetic fluid, such as DURASOIL from SOILWORKS or the Shell Risella X series from ROYAL DUTCH SHELL including, for example, Shell Risella X 415, Shell Risella X 420, or Shell Risella X 430. In one or more embodiments, the synthetic fluids can comprise compounds from CAS No. 848301-69-9, CAS No. 1262661-88-0, or a combination thereof.

Since the synthetic fluids can be derived from a GTL process, they can have a more uniform chemical structure compared to conventionally-derived petroleum products. For example, at least 15, 25, 40, 65, 80 or 90 percent by weight of the acyclic aliphatic compounds and/or cyclic aliphatic compounds in the synthetic fluid can have a carbon chain length in the range of $C_{24}$ to $C_{36}$.

In certain embodiments, at least 3, 4, 5, 7, 10, 15, 20, 25, 30, or 35 and/or not more than 99, 95, 90, 85, 80, 75, 70, 65, 60, or 55 percent of the acyclic aliphatic compounds by weight can have a carbon chain length in the range of $C_{29}$ to $C_{36}$. Additionally or alternatively, at least 3, 4, 5, 7, 10, 15, 20, 25, 30, or 35 and/or not more than 99, 95, 90, 85, 80, 75, 70, 65, 60, or 55 percent of the cyclic aliphatic compounds by weight can have a carbon chain length in the range of $C_{29}$ to $C_{36}$.

Furthermore, in various embodiments, the acyclic aliphatic compounds and/or the cyclic aliphatic compounds can be saturated. For example, at least 75, 80, 85, 90, 95, or 99 percent of the acyclic aliphatic compounds and/or the cyclic aliphatic compounds can be saturated as measured according to ASTM D2007.

As discussed further below, the synthetic fluid is hydrophobic and, therefore, not water soluble, which can be an important property when used as a compaction aid in artic and subarctic conditions. This can allow the synthetic fluids to resist rain and other aqueous influences that could negatively affect the long term stability of the compaction aid composition.

Additionally, the synthetic fluid can have a paraffin wax content of at least 40, 50, or 60 and/or not more than 95, 80, or 70 weight percent.

As noted above, since the GTL synthetic fluids can be derived from synthesis gases, which have been previously purified, the resulting GTL synthetic fluids can also have a high purity. For example, the synthetic fluids can comprise less than 10, 5, 3, 1, or 0.5 weight percent of aromatics as measured using chromatography and mass spectroscopy. Furthermore, the synthetic fluids can comprise less than 5, 3, 1, or 0.5 weight percent of nitrogen. Moreover, the synthetic fluids can comprise less than 5, 3, 1, or 0.5 weight percent of sulfur as measured according to ISO 14596.

In addition, the synthetic fluids can exhibit various properties that can influence and/or enhance the functionality of the compaction aid compositions.

The pour point of the compaction aid composition is an important consideration, especially when the composition is utilized in arctic (i.e., freezing) conditions. By containing a desirable pour point, the compaction aid compositions can be applied under conditions wherein most water-based products would freeze. In various embodiments, the synthetic fluids can have a pour point of no lower than −100, −90, −75, −65 or −50° C. and/or not higher than 0, −5, −10, −15, or −20° C. as measured according to ASTM D97. More particularly, the synthetic fluids can have a pour point in the range of −100 to 0° C., −90 to −5° C., −75 to −10° C., −65 to −15° C., or −50 to −20° C. as measured according to ASTM D97.

In one or more embodiments, the synthetic fluids can have lower viscosities compared to conventional mineral oils, such as paraffinic and naphthenic process oils, that are commonly used in the art. Consequently, this can lead to performance advantages when utilized in the compaction aid compositions.

Viscosity can be an important property in the compaction aid compositions. For example, if the compaction aid composition is too thin, then it may not adequately coat the particulates in the soil, sand, or aggregates being treated. Alternatively, if the compaction aid composition is too viscous, then it may be difficult to apply using conventional spray equipment.

In various embodiments, the synthetic fluids can have a kinematic viscosity at 40° C. of at least 0.5, 2, or 5 and/or not more than 100, 40, or 10 mm$^2$/s as measured according to ASTM D2271. More particularly, the synthetic fluids can have a kinematic viscosity at 40° C. in the range of 0.5 to 100, 2 to 40, or 5 to 10 mm$^2$/s as measured according to ASTM D2271.

In various embodiments, the synthetic fluids can have a kinematic viscosity at 100° C. of at least 5, 10, or 18 and/or not more than 100, 40, or 25 mm$^2$/s as measured according to ASTM D2271. More particularly, the synthetic fluids can have a kinematic viscosity at 100° C. in the range of 5 to 100, 10 to 40, or 18 to 25 mm$^2$/s as measured according to ASTM D2271.

Additionally or alternatively, the synthetic fluids can have a viscosity index of at least 25, 50, or 100 and/or not more than 200, 150, or 140 as measured according to ISO 2909. More particularly, the synthetic fluids can have a viscosity index in the range of 25 to 200, 50 to 150, or 100 to 140 as measured according to ISO 2909.

In various embodiments, the synthetic fluids can have a dynamic viscosity at 0° C. of at least 1, 30, or 65 and/or not more than 2,000, 1,000, or 125 cP as measured according to ASTM D445. More particularly, the synthetic fluids can have a dynamic viscosity at 0° C. in the range of 1 to 2,000, 30 to 1,000, or 65 to 125 cP as measured according to ASTM D445. Furthermore, in certain embodiments, the synthetic fluids can have a dynamic viscosity at 20° C. of at least 1, 10, or 30 and/or not more than 2,000, 500, or 75 cP as measured according to ASTM D445. More particularly, the synthetic fluids can have a dynamic viscosity at 20° C. in the range of 1 to 2,000, 10 to 500, or 30 to 75 cP as measured according to ASTM D445. Moreover, in certain embodiments, the synthetic fluids can have a dynamic viscosity at 40° C. of at least 0.5, 1, or 10 and/or not more than 2,000, 250, or 30 cP as measured according to ASTM D445. More particularly, the synthetic fluids can have a dynamic viscosity at 40° C. in the range of 0.5 to 2,000, 1 to 250, or 10 to 30 cP as measured according to ASTM D445.

In one or more embodiments, the synthetic fluids can have lower densities compared to paraffinic process oils and naphthenic process oils that are commonly used in the art. Consequently, this can lead to performance advantages when utilized in the compaction aid compositions. For example, in various embodiments, the synthetic fluids can have a density at 15° C. of at least 400, 600, or 800 and/or not more than 900, 875, or 840 kg/m$^3$ as measured according to ISO 12185. More particularly, the synthetic fluids can have density in the range of 400 to 900, 600 to 875, or 800 to 840 kg/m$^3$ as measured according to ISO 12185. Furthermore, in various embodiments, the synthetic fluids can have a specific gravity of at least 0.75, 0.8, or 0.85 and/or not more than 0.95, 0.92, or 0.88 as measured according to ASTM D1298. More particularly, the synthetic fluids can have a specific gravity in the range of 0.75 to 0.95, 0.8 to 0.92, or 0.85 to 0.88 as measured according to ASTM D1298. Moreover, the synthetic fluids can have an API gravity at 60° F. (16° C.) as measured according to ASTM D287 of at least 10°, 20°, 30°, or 40° and/or not more than 100°, 80°, 60°, or 45° API. More particularly, the synthetic fluids can have an API gravity at 60° F. (16° C.) as measured according to ASTM D287 in the range of 10° to 100°, 20° to 80°, 30° to 60, or 40° to 45° API.

In one or more embodiments, the synthetic fluids can exhibit desirable volatility properties that are suited for use in compaction aids. In various embodiments, the synthetic fluids can have a boiling point of at least 100, 150, or 175 and/or not more than 800, 500, or 300° C. More particularly, the synthetic fluids can have a boiling point in the range of 100 to 800° C., 150 to 500° C., or 175 to 300° C. In various embodiments, the synthetic fluids can have a flash point of at least 150, 175, or 200° C. and/or not more than 325, 300, or 275° C. as measured according to ISO 2592. More particularly, the synthetic fluids can have a flash point in the range of 150 to 325° C., 175 to 300° C., or 200 to 275° C. as measured according to ISO 2592.

Additionally or alternatively, the synthetic fluids can comprise a NOACK volatility at 250° C. for 1 hour of not more than 100, 75, 60, or 45 percent as measured according to ASTM D972. Moreover, in various embodiments, the synthetic fluids can have an aniline point of at least 35, 80, or 110° C. and/or not more than 205, 175, or 125° C. as measured according to ASTM D611. More particularly, the synthetic fluids can have an aniline point in the range of 35 to 205° C., 80 to 175° C., or 110 to 125° C. as measured according to ASTM D611.

In one or more embodiments, the synthetic fluids can be biodegradable and exhibit other properties that make the resulting compaction aid compositions more desirable for use in a wide array of environments. For example, the synthetic fluids can have a dielectric strength of at least 15, 25, or 45 and/or not more than 100, 75, or 50 as measured according to ASTM D877. More particularly, the synthetic fluids can have a dielectric strength in the range of 15 to 100, 25 to 75, or 45 to 50 as measured according to ASTM D877.

In certain embodiments, the synthetic fluid is not flammable according to the UN GHS criteria. Moreover, in various embodiments, the synthetic fluid is neither self-reactive nor self-heating and will not undergo exothermic decomposition when heated. Additionally, the synthetic fluid can have a conductivity as measured by ASTM D2624 of at 2,000, 3,500, or 5,500 pS/m and/or not more than 10,000, 7,000, or 6,000 pS/m. More particularly, the synthetic fluid can have a conductivity as measured by ASTM D2624 in the range of 2,000 to 10,000 pS/m, 3,500 to 7,000 pS/m, or 5,500 to 6,000 pS/m.

In one or more embodiments, the synthetic fluids can exhibit and maintain desirable coloring suitable for use in the compaction aid composition. For example, the synthetic fluids can have an ASTM Color of less than 3, 2, or 1 as measured according to ASTM D1500. Additionally or alternatively, the synthetic fluids can have a Saybolt Color of less than 60, 50, or 35 as measured according to ASTM D156.

Furthermore, the compaction aid compositions described herein can exhibit a sandwich corrosion test score of not more than 2, or not more than 1, as measured according to ASTM F1110. Additionally or alternatively, the compaction aid compositions can exhibit no crazing, cracking, or etching as measured via the acrylic crazing test (ASTM F484).

It should be noted that the above recited properties of the synthetic fluids can also apply to the compaction aid compositions, especially in embodiments where the compaction aid compositions are formed entirely from the synthetic fluids.

Binders and Additives for the Compaction Aid Compositions

In addition to the synthetic fluids, the compaction aid compositions described herein can comprise one or more binders. The binders can have multiple functions in the compaction aid composition. For example, the binders can help the compaction aid composition adhere to the treated soil or aggregate material and can cause the particulates therein to agglomerate. Furthermore, in certain embodiments, the synthetic fluids can function as plasticizers for the binders.

In one or more embodiments, the compaction aid composition can comprise at least 1, 5, 10, or 20 and/or not more than 95, 75, 50, or 30 weight percent of one or more binders. More particularly, the compaction aid composition can comprise in the range of 1 to 95, 5 to 75, 10 to 50, or 20 to 30 weight percent of one or more binders. The binders can include, for example, carboxylic acids and their derivatives, polyolefins, waxes, tars, pitch, starch, silicates, lime, glycerin, stearate, or cement.

In certain embodiments, the compaction aid compositions can comprise little to no binders. For example, in certain embodiments, the compaction aid compositions can comprise less than 20, 10, 5, 3, 1, 0.5, or 0.1 weight percent of binders.

In various embodiments, the binders can comprise at least one compound containing a carboxylic acid or a derivative thereof. In certain embodiments, the binders can comprise a compound containing a carboxylic acid. In one or more embodiments, the compaction aid can comprise at least 1, 5, 10, or 20 and/or not more than 95, 75, 50, or 30 weight percent of at least one compound containing a carboxylic acid or a derivative thereof. More particularly, the compaction aid can comprise in the range of 1 to 95, 5 to 75, 10 to 50, or 20 to 30 weight percent of at least one compound containing a carboxylic acid or a derivative thereof. Additionally, in certain embodiments, the compound containing a carboxylic acid can be a tall pitch oil.

In certain embodiments, the compaction aid compositions can comprise little to no compounds having carboxylic acids. For example, in certain embodiments, the compaction aid compositions can comprise less than 5, 3, 1, or 0.5 weight percent of compounds having carboxylic acids.

In various embodiments, the binder can comprise at least one polyolefin, including, for example, thermoplastic polyolefins and elastomeric polyolefins. The polyolefins that can be incorporated into the compaction aid compositions can include, for example, polyisobutylene, polyethylene, polypropylene, polymethylpentene, polybutene, ethylene propylene rubber, ethylene propylene diene monomer rubber, or combinations thereof. In certain embodiments, the polyolefin can comprise polyisobutylene.

In one or more embodiments, the compaction aid composition can comprise at least 1, 5, 10, or 20 and/or not more than 95, 75, 50, or 30 weight percent of at least one polyolefin. More particularly, the compaction aid composition can comprise in the range of 1 to 95, 5 to 75, 10 to 50, or 20 to 30 weight percent of at least one polyolefin.

In one or more embodiments, the compaction aid compositions can comprise little to no polyolefins. For example, in certain embodiments, the compaction aid compositions can comprise less than 5, 3, 1, or 0.5 weight percent of polyolefins.

In various embodiments, the compaction aid compositions can comprise at least one additive including, for example, fillers, sulfonates, viscosity modifiers, pour point depressants, synthetic fibers, asphalt emulsions, lignins, non-synthetic base oils, natural fibers, magnesium chloride, calcium chloride, sodium chloride, or combinations thereof. In one or more embodiments, the compaction aid compositions can comprise at least 0.5, 1, 3, or 5 and/or not more than 75, 50, or 25, or 10 weight percent of at least one additive. More particularly, the compaction aid compositions can comprise in the range of 0.5 to 75, 1 to 50, 3 to 25, or 5 to 10 weight percent of at least one additive.

Alternatively, in various embodiments, the compaction aid can comprise less than 1, 0.5, or 0.1 weight percent of any one of the above listed additives. More specifically, the compactions aids can contain little to no additives.

In various embodiments, the compaction aid does not require any water. As discussed above, the compaction aid can be formed from a hydrophobic synthetic fluid, which can bind and coat all of the particulates of the soils and aggregates to be compacted. Consequently, the use of the compaction aid can make the compacted soil or aggregate at least partially water-repellent, while also aiding compaction. In one or more embodiments, the compaction aid can comprise less than 10, 5, 3, 1, or 0.5 weight percent of water.

The compaction aid compositions can be formed using any conventional mixers known and utilized in the art. For example, in embodiments where the compaction aid composition comprises multiple components, these components may be combined using any conventional mixers such as, for example, high shear mixers, colloid mills, or any other mixing apparatus known in the art.

The components forming the compaction aid composition can be mixed together at room temperature or under heated conditions in order to form the compaction aid compositions. For example, in certain embodiments, the components forming the compaction aid composition can be blended at a temperature in the range of 15 to 250° C., 35 to 200° C., or 45 to 175° C. until a consistent mixture is obtained.

Methods for Compacting Soils, Sands, and Other Aggregates

When soils and aggregates are compacted, it can be necessary to apply enough compactive effort to break down any larger chunks of soil or aggregate to prevent any large voids from remaining in the compacted material. For a soil or aggregate that is frozen or near frozen at arctic or subarctic conditions, the compaction process can be more difficult since the various aggregates can be joined together by the cohesiveness of ice.

Additionally, the compaction characteristics of the compacted material can vary depending on the amount of compaction aid and the application method utilized. For example, the type of compaction machinery, the soil properties, and the temperature of the environment can influence compaction properties.

The compaction aid can be applied to the various soils, sands, and aggregates to be treated using conventional spray equipment. For example, the compaction aid can be gravity fed or pumped through hoses, spray nozzles, or fixed sprayers. Likewise, motor graders, asphalt graders, pug mills, compactors, rollers, and other conventional construction equipment may be utilized to blend, set grade, and compact the compaction aid and the various soils, sands, and aggregates.

In certain embodiments, compaction of the material can be performed with a compactor.

In various embodiments, a predetermined surface can be excavated prior to application of the compaction aid. After excavation, at least a portion of the excavated material can then be combined with the compaction aid to form a treated mixture. Subsequently, the treated mixture can then be applied to the excavated area to form the desired earthwork structure.

The total energy applied to the treated material (compactive effort) is one of the most important factors to consider when compacting the treated material and can greatly influence the maximum unit weight and moisture content in the compacted material. The necessary compaction energy can be applied to the treated material by impact, vibration, and/or kneading methods.

Application rates of the compaction aid composition can vary depending on the type of material to be compacted and the desired earthwork structure one wants to form. For example, the weight and/or frequency of traffic, thickness of the soil or aggregate, climate, rainfall, and porosity of the soil or aggregate can be considered. In various embodiments, the compaction aid composition can be applied to a material at a rate of at least 0.001, 0.01, 0.05, 0.1, or 0.2 and/or not more than 10, 8, 7, 6, or 4 gallons per square yard. More particularly, the compaction aid composition can be applied to a material at a rate in the range of 0.001 to 10, 0.01 to 8, 0.05 to 7, 0.1 to 6, or 0.2 to 4 gallons per square yard.

Additionally or alternatively, the treated mixture containing the compaction aid and the soil and/or aggregate to be compacted can contain at least 0.01, 0.02, 0.05, 0.1, 0.12, 0.14, 0.16, 0.18, or 0.2 and/or not more than 10, 5, 3, 2, 1, 0.8, 0.6, 0.5, or 0.4 weight percent of the compaction aid based on the entire weight of the treated mixture. More particularly, the treated mixture containing the compaction aid and the soil and/or aggregate to be compacted can contain in the range of 0.01 to 10, 0.02 to 5, 0.05 to 3, 0.1 to 2, 0.12 to 1, 0.14 to 0.8, 0.16 to 0.6, 0.18 to 0.5, or 0.2 to 0.4 weight percent of the compaction aid based on the entire weight of the treated mixture. It should be noted that the total weight of the treated mixture does not include any soil and/or aggregate that has not been subjected to blending with the compaction aid.

As discussed above, the compaction aid can be used to compact various soils, sands, and aggregates in arctic and subarctic (i.e., freezing) conditions. For example, the compaction aid can be blended with the soils, sands, and aggregates at temperatures of less than 10, 5, 0, −10, −15, −20, −25, or −30° C. and then compacted under these same temperatures to form the desired earthwork.

The thickness of the compacted layers in the resulting earthwork formed from the compaction aid and the desired soil, sand, or aggregate can vary depending on the type of earthwork and its function. For example, a road may have a base compacted layer having a thickness in the range of 6 to 12 inches that is compacted to 95% density prior to adding asphalt thereon. Similarly, a runway may have a base compacted layer having a thickness in the range of 18 to 30 inches that is compacted to 95% density prior to adding asphalt thereon. Furthermore, certain earthworks, such as embankments and backfills, may require even thicker compacted layers to provide the necessary support for their intended application.

Due to the compaction process, the compacted material will have a greater dry density relative to the uncompacted soil or aggregate. For example, the dry density of the compacted material at −40° C. can be at least 5, 10, 20, 30, 40, 50, 60, 70, 80, 90, 100, or 200 percent greater than the dry density of the uncompacted soil or aggregate at −40° C. as measured according to ASTM D698. Similarly, the dry density of the compacted material at −60° C. according to the present invention can be at least 5, 10, 20, 30, 40, 50, 60, 70, 80, 90, 100, or 200 percent greater than the dry density of the uncompacted soil or aggregate at −60° C. as measured according to ASTM D698.

In addition, the compaction aids can improve the shear strength of the treated material compared to the untreated material. Thus, the treated material can withstand greater loads when compacted relative to the uncompacted materials. In other words, by incorporating the compaction aid into the various soils, sands, and aggregates and compacting these mixtures, one can improve the bearing strength and other mechanical properties of the soil, sands, and/or aggregates. For example, the bearing strength as measured according to ASTM D4429 of the compacted material at −40° C. can be at least 5, 10, 20, 30, 40, 50, 60, 70, 80, 90, 100, or 200 percent greater than the bearing strength of the uncompacted soil or aggregate at −40° C. Similarly, the bearing strength as measured according to ASTM D4429 of the compacted material at −60° C. can be at least 5, 10, 20, 30, 40, 50, 60, 70, 80, 90, 100, or 200 percent greater than the bearing strength of the uncompacted soil or aggregate at −60° C.

Consequently, due to the compaction aid described herein, improvements in compacted soil characteristics can be achieved in cold weather environments at temperatures well below the freezing point of water.

This invention can be further illustrated by the following examples of embodiments thereof, although it will be understood that these examples are included merely for the purposes of illustration and are not intended to limit the scope of the invention unless otherwise specifically indicated.

EXAMPLES

Example 1

In this example, the compacting properties of DURASOIL from SOILWORKS (Scottsdale, Ariz.) was compared to water at temperatures of 76° F. (24.4° C.), −40° F. (−40° C.), and −76° F. (−60° C.). In particular, the testing was performed in accordance with ASTM D698 in order to test the effectiveness of these compaction aids at achieving desirable densities in arctic environmental conditions, which are generally below the freezing point of water.

The tests were performed in accordance with ASTM D698 at temperatures of 76° F. (24.4° C.), −40° F. (−40° C.), and −76° F. (−60° C.). Dry ice and a deep chest freezer were used to simulate the colder temperatures used in the testing. Silt was the chosen material to be tested in this study.

ASTM D698 outlines processes to determine the optimum compaction aid contents and maximum dry densities for compacted samples. In performing the tests at room temperature (76° F.), material samples were prepared per the ASTM standard, compaction aid contents by percent of weight were determined, and the testing procedures followed the ASTM standards. Utilizing the standard five point compaction curve for both water and DURASOIL, the optimum compaction aid contents and maximum dry densities were developed for each testing medium. The tested contents by percent of weight for DURASOIL were the same as those that were developed for water in order to allow for a direct comparison. These same contents were utilized for both the tests at −40° F. (−40° C.) and −76° F. (−60° C.). In order to bring the testing samples to the proper temperature, the premixed sample of water or DURASOIL and silt were mixed in covered containers for each of the proctored tests and placed in a freezer, which by itself could only maintain a running temperature of −10° F. (−23.3° C.). Dry ice was used in varying quantities to reach and maintain a constant temperature of either −40° F. (−40° C.) and −76° F. (−60° C.). The test materials were left inside of the deep freezer until they stabilized at the testing temperatures. After stabilization, the testing samples were removed from the freezer to prepare the molds needed for the ASTM test. As the testing was completed for each temperature range and weight content, per the ASTM testing standards, all data was translated and charted to develop a five point standard proctor chart for each set of tests. This chart is provided herewith as FIG. 1.

The results of the tests are demonstrated in Table 1, below. The "wt. %" in Table 1 refers to the amount of water or DURASOIL added to the treated silt based on the total weight of the compaction aid and silt. The "total weight" in Table 1 refers to the total weight of the tested sample, which includes the silt and compaction aid (water or DURASOIL). The wet densities and wet unit weights of the treated samples were measured in accordance with ASTM D698.

TABLE 1

| Product | Temperature | Property | Sample 1 | 2 | 3 | 4 | 5 | 6 |
|---|---|---|---|---|---|---|---|---|
| Water | 76° F. (24.4° C.) | Wt. % of Water | 0.12 | 0.14 | 0.16 | 0.18 | 0.20 | — |
| | | Total Weight | 1735.5 | 1780 | 1851 | 1885.5 | 1867 | — |

TABLE 1-continued

| Product | Temperature | Property | Sample 1 | 2 | 3 | 4 | 5 | 6 |
|---|---|---|---|---|---|---|---|---|
| | | Wet Density (g/cm³) | 1.83 | 1.88 | 1.96 | 1.99 | 1.97 | — |
| | | Wet Unit Weight (lbs/ft³) | 114.24 | 117.36 | 122.36 | 124.23 | 122.98 | — |
| | −40° F. (−40° C.) | Wt. % of Water | 0.12 | 0.14 | 0.16 | 0.18 | 0.20 | — |
| | | Total Weight | 1301.5 | 1339 | 1370.5 | 1486 | 1186 | — |
| | | Wet Density (g/cm³) | 1.37 | 1.41 | 1.45 | 1.57 | 1.25 | — |
| | | Wet Unit Weight (lbs/ft³) | 85.52 | 88.02 | 90.52 | 98.01 | 78.03 | — |
| | −76° F. (−60° C.) | Wt. % of Water | 0.12 | 0.14 | 0.16 | 0.18 | 0.20 | — |
| | | Total Weight | 1291 | 1349 | 1242.5 | 1211.5 | 1141 | — |
| | | Wet Density (g/cm³) | 1.36 | 1.42 | 1.31 | 1.28 | 1.2 | — |
| | | Wet Unit Weight (lbs/ft³) | 84.9 | 88.65 | 81.78 | 79.91 | 74.91 | — |
| DURASOIL | 76° F. (24.4° C.) | Wt. % of DS | 0.12 | 0.14 | 0.16 | 0.18 | 0.20 | — |
| | | Total Weight | 1576 | 1640.5 | 1693 | 1745.5 | 1715.5 | — |
| | | Wet Density (g/cm³) | 1.67 | 1.73 | 1.79 | 1.85 | 1.81 | — |
| | | Wet Unit Weight (lbs/ft³) | 104.25 | 108 | 111.74 | 115.49 | 112.99 | — |
| | −40° F. (−40° C.) | Wt. % of DS | 0.12 | 0.14 | 0.16 | 0.18 | 0.20 | 0.22 |
| | | Total Weight | 1601 | 1657.5 | 1699.5 | 1759 | 1762.5 | 1750.5 |
| | | Wet Density (g/cm³) | 1.69 | 1.75 | 1.8 | 1.86 | 1.87 | 1.85 |
| | | Wet Unit Weight (lbs/ft³) | 105.5 | 109.25 | 112.37 | 116.11 | 116.74 | 115.49 |
| | −76° F. (−60° C.) | Wt. % of DS | 0.12 | 0.14 | 0.16 | 0.18 | 0.20 | 0.22 |
| | | Total Weight | 1631.5 | 1554.5 | 1723.5 | 1789 | 1829 | 1709 |
| | | Wet Density (g/cm³) | 1.72 | 1.64 | 1.82 | 1.89 | 1.93 | 1.81 |
| | | Wet Unit Weight (lbs/ft³) | 107.37 | 102.38 | 113.62 | 117.99 | 120.48 | 112.99 |

In order to effectively compact a soil or aggregate to their maximum densities, compaction aids are required in varying amounts to assist in the compaction process. As shown in FIG. 1 and the table above, as water freezes below 0° C. and turns from liquid to solid in the form of ice, its ability to be utilized as a compaction aid is lost. However, the DURASOIL did not freeze and remained viscous and retained its wetting properties even at −76° F. (−60° C.). Thus, the present example demonstrated the efficacy of DURASOIL as a compaction aid in arctic conditions and how it is superior to common compaction aids, such as water, under these extreme conditions.

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method for compacting a material comprising:
   combining a compaction aid with a material to form a treated material;
   wherein the compaction aid comprises a synthetic fluid containing at least one acyclic aliphatic compound and at least one cyclic aliphatic compound,
   wherein the at least one acyclic aliphatic compound comprises one or more methyl-branched alkanes, one or more dimethyl-branched alkanes, and one or more trimethyl-branched alkanes,
   wherein the synthetic fluid comprises:
   5 to 75 weight percent of the one or more methyl-branched alkanes;
   5 to 70 weight percent of the one or more dimethyl-branched alkanes; and
   5 to 60 weight percent of the one or more trimethyl-branched alkanes.

2. The method of claim 1, further comprising compacting the treated material into a compacted material.

3. The method of claim 1, wherein the material comprises at least 70 weight percent of a soil, sand, aggregate, or mixtures thereof.

4. The method of claim 1, wherein the at least one cyclic aliphatic compound comprises one or more dimethyl-branched alkanes with cyclopentyl or cyclohexyl rings, wherein the synthetic fluid comprises in the range of 0.5 to 60 weight percent of the one or more dimethyl-branched alkanes with cyclopentyl or cyclohexyl rings.

5. The method of claim 1, wherein the synthetic fluid is derived from a Gas-to-Liquids ("GTL") process.

6. The method of claim 1, wherein the compaction aid consists of the synthetic fluid.

7. The method of claim 1, wherein the compaction aid comprises at least one binder.

8. The method of claim 1, wherein at least 15 weight percent of the at least one acyclic aliphatic compound has a carbon chain length in the range of $C_{29}$ to $C_{36}$, wherein at least 10 weight percent of the at least one cyclic aliphatic compound has a carbon chain length in the range of $C_{29}$ to $C_{36}$.

9. The method of claim 1, wherein at least 65 weight percent of the at least one acyclic aliphatic compound has a carbon chain length in the range of $C_{24}$ to $C_{36}$, wherein at least 65 weight percent of the at least one cyclic aliphatic compound has a carbon chain length in the range of $C_{24}$ to $C_{36}$.

10. The method of claim 1, wherein the compaction aid does not comprise a compound containing a carboxylic acid, a polyolefin, a pour point depressant, or synthetic fibers.

11. A method for compacting a material comprising:
    (a) combining a compaction aid with the material to form a mixture;
    (b) compacting the mixture to form a compacted matrix;
    wherein the compaction aid comprises a synthetic fluid containing at least one acyclic aliphatic compound and at least one cyclic aliphatic compound,
    wherein at least 15 weight percent of the at least one acyclic aliphatic compound has a carbon chain length in the range of $C_{29}$ to $C_{36}$, wherein at least 15 weight percent of the at least one cyclic aliphatic compound has a carbon chain length in the range of $C_{29}$ to $C_{36}$.

12. The method of claim 11, wherein the material comprises at least 70 weight percent of a soil, sand, aggregate, or mixtures thereof.

13. The method of claim 11, wherein the at least one acyclic aliphatic compound comprises one or more methyl-branched alkanes, one or more dimethyl-branched alkanes, and one or more trimethyl-branched alkanes, wherein the synthetic fluid comprises:
    5 to 75 weight percent of the one or more methyl-branched alkanes,
    5 to 70 weight percent of the one or more dimethyl-branched alkanes, and
    5 to 60 weight percent of the one or more trimethyl-branched alkanes.

14. The method of claim 11, wherein the at least one cyclic aliphatic compound comprises one or more dimethyl-branched alkanes with cyclopentyl or cyclohexyl rings, wherein the synthetic fluid comprises in the range of 0.5 to 60 weight percent of the one or more dimethyl-branched alkanes with cyclopentyl or cyclohexyl rings.

15. The method of claim 11, wherein the compaction aid consists of the synthetic fluid.

16. The method of claim 11, wherein at least 20 weight percent of the at least one acyclic aliphatic compound has a carbon chain length in the range of $C_{29}$ to $C_{36}$, wherein at least 20 weight percent of the at least one cyclic aliphatic compound has a carbon chain length in the range of $C_{29}$ to $C_{36}$.

17. The method of claim 11, wherein at least 65 weight percent of the at least one acyclic aliphatic compound has a carbon chain length in the range of $C_{24}$ to $C_{36}$, wherein at least 65 weight percent of the at least one cyclic aliphatic compound has a carbon chain length in the range of $C_{24}$ to $C_{36}$.

18. The method of claim 11, wherein the compaction aid does not comprise a compound containing a carboxylic acid, a polyolefin, a pour point depressant, or synthetic fibers.

19. A method for compacting a material comprising:
    (a) combining a compaction aid with the material to form a mixture;
    (b) compacting the mixture to form a compacted matrix;
    wherein the compaction aid consists of a synthetic fluid containing at least one acyclic aliphatic compound and at least one cyclic aliphatic compound,
    wherein the at least one acyclic aliphatic compound comprises one or more methyl-branched alkanes, one or more dimethyl-branched alkanes, and one or more trimethyl-branched alkanes,
    wherein the at least one cyclic aliphatic compound comprises one or more dimethyl-branched alkanes with cyclopentyl or cyclohexyl rings,
    wherein a binder is absent in said compaction aid.

20. The method of claim 19, wherein the material comprises at least 70 weight percent of a soil, sand, aggregate, or mixtures thereof.

21. The method of claim 19, wherein at least 15 weight percent of the at least one acyclic aliphatic compound has a carbon chain length in the range of $C_{29}$ to $C_{36}$, wherein at least 10 weight percent of the at least one cyclic aliphatic compound has a carbon chain length in the range of $C_{29}$ to $C_{36}$.

22. The method of claim 19, wherein at least 65 weight percent of the at least one acyclic aliphatic compound has a carbon chain length in the range of $C_{24}$ to $C_{36}$, wherein at least 65 weight percent of the at least one cyclic aliphatic compound has a carbon chain length in the range of $C_{24}$ to $C_{36}$.

23. The method of claim 19, wherein the compaction aid does not comprise a compound containing a carboxylic acid, a polyolefin, a pour point depressant, or synthetic fibers.

\* \* \* \* \*